A. O. TATE.
ELECTRODE.
APPLICATION FILED JULY 30, 1921.

1,432,220.

Patented Oct. 17, 1922.

Inventor
ALFRED O. TATE
By his Attorneys
Sheffield & Betts

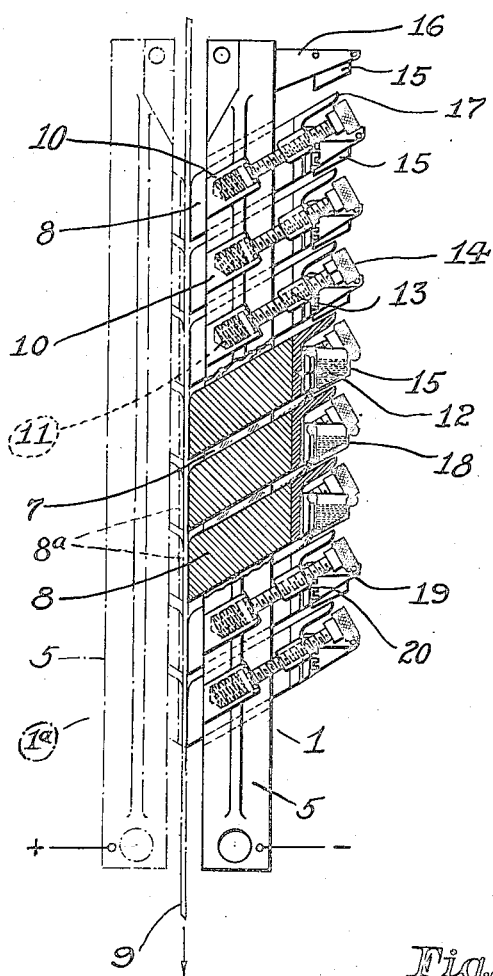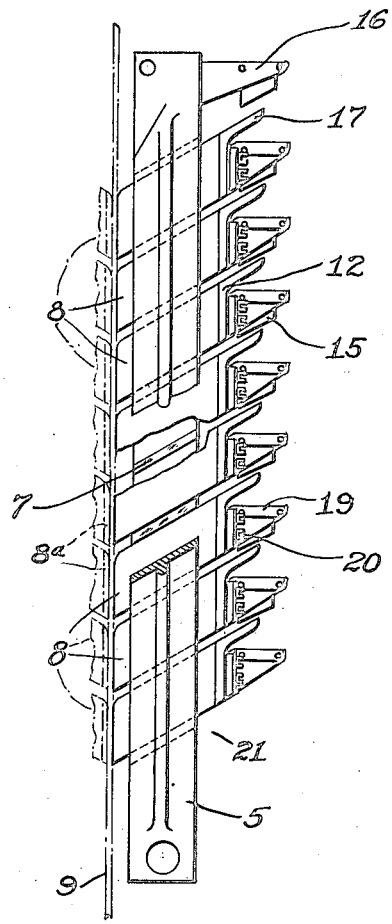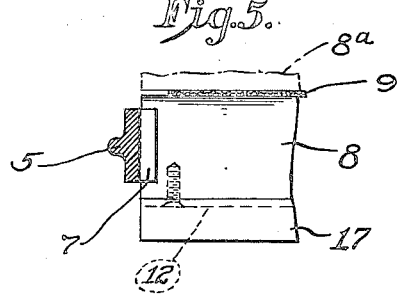

UNITED STATES PATENT OFFICE.

ALFRED O. TATE, OF NEW YORK, N. Y.

ELECTRODE.

Application filed July 30, 1921. Serial No. 488,669.

*To all whom it may concern:*

Be it known that I, ALFRED O. TATE, a subject of the King of Great Britain, and a resident of the borough of Manhattan, city, county, and State of New York, have invented certain new and useful Improvements in Electrodes, of which the following is a description.

My invention relates to electrode structures adapted for use in electrolytic apparatus and particularly for use in apparatus for treating cloth by electrolysis.

In treating cloth electrolytically in apparatus of the type illustrated in my prior patents in which the cloth moves in contact with opposed electrodes, the active negative electrode surface is bathed in electrolyte, and it is advantageous to use large electrode surfaces. Difficulty has been experienced, however, in increasing the active area of a given electrode owing to the lack of uniformity in results in case the individual electrodes are made as large as other conditions indicate, owing apparently to non-uniformity of electrolyte at different portions of the electrode surface. Moreover, the efficiency per unit area falls off with increase in area of the active surface of a single electrode, this effect also being due apparently to changes in quantity and composition of electrolyte at different portions of the active surface.

One of the objects of my invention is to provide an electrode structure capable of giving high efficiency per unit area and producing substantially uniform effects over its entire active surface.

Further objects and advantages of an electrode according to my invention will be evident to those skilled in the art from the following description taken in connection with the accompanying drawing, in which:

Fig. 3 is a side view, parts being broken away for purposes of illustration of the electrode appearing in Figs. 1 and 2, Fig. 3 also illustrating the relation of one electrode to the cooperating parts during use.

Fig. 4 is a side view, of a modified form of electrode according to my invention.

Fig. 5 is a detail view illustrating the relation of the individual electrode elements to the guides on the frame shown in the preceding figures.

Figure 1:
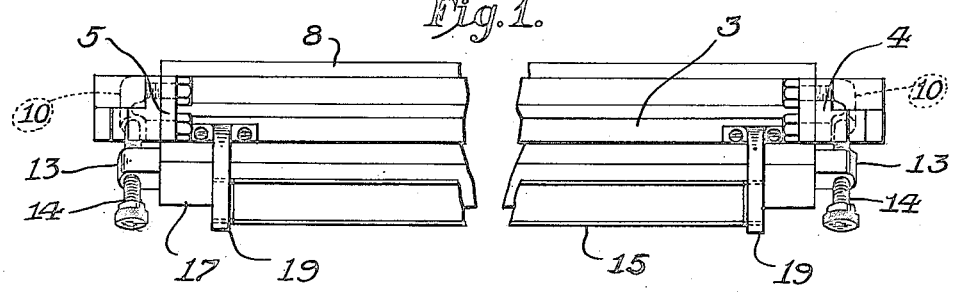
Fig. 1 is a plan view of electrode according to my invention.

Referring to the drawings, the negative electrode 1 comprises a frame including top and bottom spacing members 2 and 3, respectively, and right and left side members 4 and 5 respectively, members 2 and 3 being bolted to 4 and 5 as indicated at 6.

The side members 4 and 5 are arranged vertically when in use and each carries on its inner face a series of inclined guides such as 7, which are properly spaced to receive therebetween individual electrode elements 8, 8 which are adapted to rest and slide on the guides 7. Elements 8 of a given electrode have the same polarity and are preferably of carbon.

As illustrated in Fig. 3, electrodes such as 1 are intended to be used as the negative members in pairs of opposite polarity, cloth 9 to be treated being passed between the electrodes 1 and 1$^a$ of each pair. If desired, the electrodes of a pair may be similar. In this case, the electrodes 1 are arranged when in use so that the individual electrode elements 8 of each pair of electrode structures are on opposite sides of the cloth 9 under treatment, electrodes of each pair as a whole and the corresponding elements being at the same level. The parts are so arranged that the electrode elements 8 tend to slide of their own weight against the cloth 9. I prefer to provide means whereby the pressure of the electrode elements against the cloth may be set at any desired minimum. For this purpose I have illustrated a series of lugs such as 10 on the outside of the vertical frame members 4 and 5, lugs 10 having recesses therein to receive compression springs such as 11. Each electrode element 8 has fixed at 2 a plate 12 which is parallel to the active surface of the electrode element, the plates 12 having lugs 13 thereon which are threaded to receive adjustable screws 14 bearing against the springs 11. By adjusting the screws 14 in obvious manner, the pressure of each electrode element 8 on the cloth under treatment may be reduced as much as desired. I am thus enabled to make the electrode elements 8 very thick and heavy when new without producing at any time undesirably high pressure on the cloth. As the electrode elements wear away, the pressure against springs 11 may be released by manipulating the screws 14 until the electrode elements have been worn down as far as desirable.

In order that the amount and concentration of electrolyte may be substantially uniform over the surface of each of the electrode elements 8, I provide individual electrolyte feeding troughs 15 for each of the electrode members 8. The uppermost of such troughs is suspended by brackets 16 from the frame of the electrode and each of the electrode elements 8, except the last, carries in turn the feeding trough 15 for the electrode element below it. The plates 12 previously mentioned have flanges 17 at their upper ends, such flanges extending outwardly and upwardly and in line with the upper surface of the electrode elements to points under the feeding troughs 15 at which the flanges receive the electrolyte flowing from the troughs through apertures 18. The electrolyte consequently flows down along the upper surfaces of flanges 17 and electrodes 8 until it strikes the cloth 9, thereupon passing along the vertical active faces of the electrode elements 8. The feeding troughs 15 carried by electrode elements 8 are secured to brackets such as 19 by screws 20. The electrode elements 8 being spaced by the guide members 9, as clearly shown, the electrolyte is free to flow over their upper surfaces as described.

Figure 2:
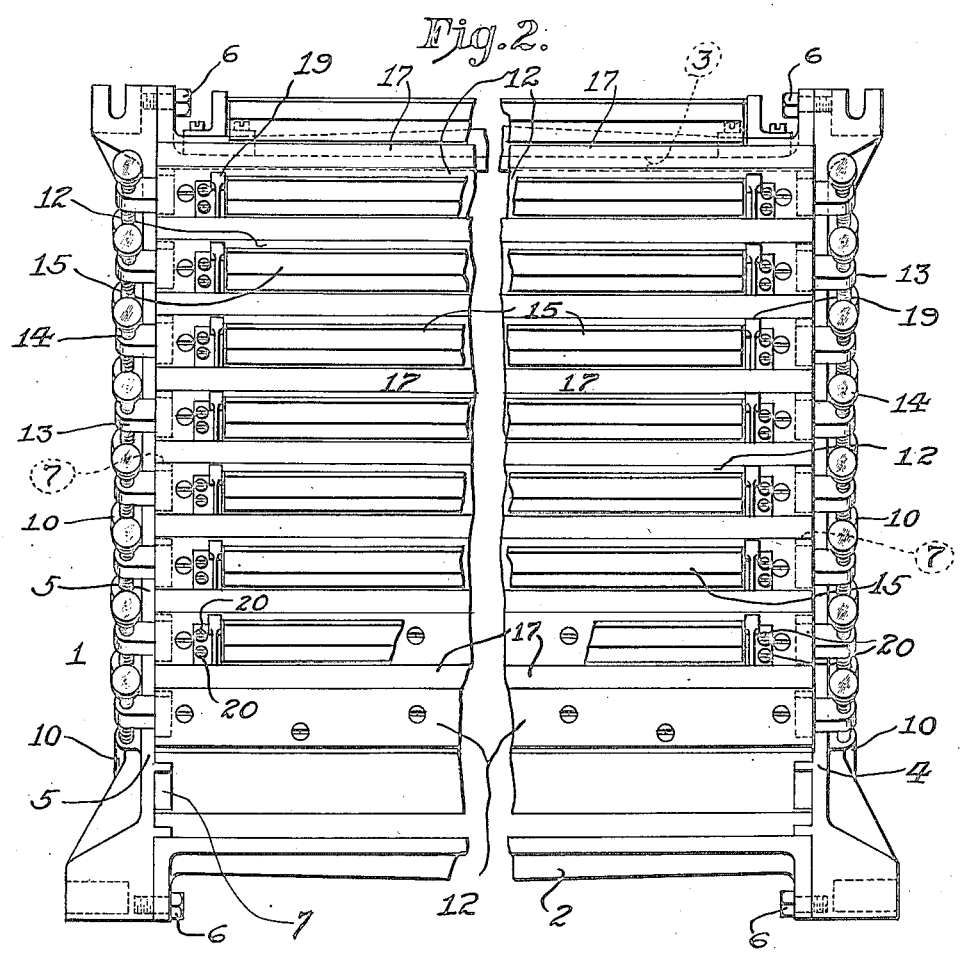
Fig. 2 is an elevation of the electrode illustrated in Fig. 1, the lowermost electrode element being removed.

In Fig. 4 I have illustrated the structure of an electrode 21 in all respects identical with that previously described in Figs. 1, 2 and 3 except that the pressure regulating means comprising springs and cooperating set screws is omitted from the arrangement of Fig. 4. While I prefer the arrangement of Figs. 1 and 3 as being adaptable to various conditions, the arrangement of Fig. 4 may nevertheless be used with good results in many cases.

It will be seen that I have provided means whereby an electrode structure may have a very large active surface while maintaining uniform conditions of operation and consequent high and uniform efficiency over such active surface. The active area of a given electrode structure according to my invention may be increased almost indefinitely by increasing the number of individual electrode elements and their horizontal length without necessitating an increase in the vertical dimensions of the individual electrode elements 8. In the arrangements above described the individual electrolyte feeding troughs extend horizontally the entire length of the elements. The individual electrode elements therefore, have no portions of their active surfaces far from the supply of fresh electrolyte, provided their vertical dimensions are kept small. I prefer for this reason to make elements 8 parallelogrammatic in cross-section, the working faces being not more than three inches in vertical dimension.

While an electrode structure according to my invention is particularly designed for use as a negative electrode in apparatus of the types illustrated in my prior Patents 1,215,077, 1,228,986, and 1,228,988, it may be used also, with such modifications in details as are suggested by my said patents as a positive electrode in such apparatus, it may also be used as the negative element in a pair of electrodes of which the positive element is a single sheet or plate of aluminum provided with a moistened pad according to my said prior patents. When an electrode having a plurality of electrode elements, as in electrode 1, is used as the positive electrode of a cloth treating machine according to one of my said patents these elements are of aluminum and are provided with pads 8ᵃ to absorb the aluminum hydroxide formed. However, I do not limit myself to using my present electrode in cloth treating or water proofing apparatus. Neither do I limit myself to details of construction or arrangement herein disclosed, but desire protection for mechanical equivalents of such details.

Having thus described my invention, I claim:

1. An electrode structure comprising a frame, plurality of electrode elements of the same polarity carried in said frame and individually movable in relation thereto, and means for supplying electrolyte to each of said elements individually.

2. An electrode structure comprising a frame, a plurality of individually movable electrode elements of the same polarity carried in said frame and spaced apart therein, and means for passing electrolyte into the space between adjacent electrode elements.

3. An electrode structure comprising a frame, plurality of spaced individual electrode elements movably mounted in said frame, said electrode elements when in use having their upper surfaces inclined downwardly toward the material to be treated, and means for flowing electrolyte along said upper surfaces.

4. An electrode structure comprising a frame, a plurality of spaced inclined electrode elements of the same polarity movably mounted in said frame, said plates extending outwardly and upwardly from the upper edge of said electrode elements, and troughs extending above said plates and feeding electrolyte thereon.

5. An electrode structure comprising in combination a frame, a plurality of electrode elements of the same polarity carried in said frame and individually movable in relation thereto, inclined guides on said frame on which said elements are mounted, and springs between said frame and said elements partially sustaining the weight of said elements when in operative position.

6. An electrode structure comprising in combination a frame, a plurality of electrode elements of the same polarity carried in said frame and individually movable in relation thereto, inclined guides on said frame on which said elements are mounted, and springs between said frame and said elements partially sustaining the weight of said elements when in operative position, and means for adjusting the stress on said springs.

ALFRED O. TATE.